3,379,754
AMINOBENZOIC ACID DERIVATIVES OF ADAMANTYL GLYOXALS
Jack Bernstein, New Brunswick, N.J., assignor, by mesne assignments, to E. R. Squibb & Sons, Inc., New York, N.Y., a corporation of Delaware
No Drawing. Filed Apr. 15, 1965, Ser. No. 448,289
3 Claims. (Cl. 260—519)

ABSTRACT OF THE DISCLOSURE

This invention relates to derivatives of adamantyl glyoxals having the formula

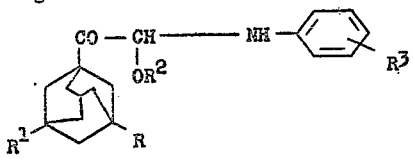

wherein R and $R^1$ each is hydrogen, halo, lower alkyl, phenyl or lower alkoxy, $R^2$ is hydrogen or lower alkyl and $R^3$ is hydrogen, halo, lower alkyl, lower alkoxy or carboxy. They are useful as antiviral agents.

---

This invention relates to new chemical compounds. More particularly, this invention relates to new compounds of the formula (I)

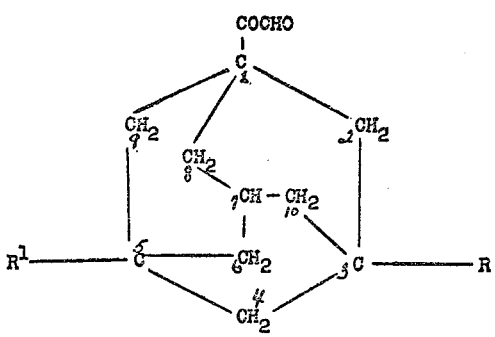

wherein R and $R^1$ each is hydrogen, halo, lower alkyl, phenyl or lower alkoxy, and to certain derivatives thereof. The derivatives are in general the reaction products of the compounds of Formula I with compounds capable of condensing with aldehydes to yield derivatives which regenerate the aldehyde upon hydrolysis. For example, the compounds of Formula I will react with sodium bisulfate as well as with amines such as aniline, p-aminobenzoic acid and the like, with hydrazides and hydrazines such as isonicotinic acid hydrazide, benzoic acid hydrazide, benzoic acid hydrazine, semicarbazide, thiosemicarbazide, phenylhydrazine, and the like. These derivatives may be represented by the formulas (II)

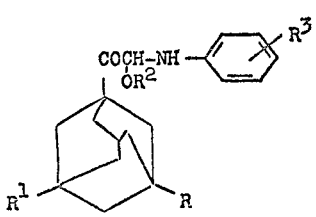

wherein R and $R^1$ have the same meaning as in Formula I, $R^2$ is hydrogen or lower alkyl and $R^3$ is hydrogen, halo, lower alkyl, lower alkoxy or carboxy, (III)

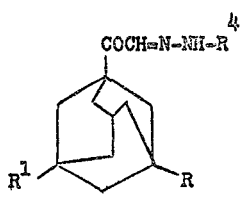

wherein R and $R^1$ have the same meaning as in Formula I and $R_4$ is phenyl, benzoyl, isonicotinoyl, carbamyl and thiocarbamyl.

The halogen substitutents represented by the various symbols R include chlorine, bromine, iodine and fluorine but the first two are preferred. Lower alkyl groups represented by those symbols include straight and branched chain aliphatic groups such as methyl, ethyl, propyl, isopropyl, butyl, isobutyl, t-butyl, amyl, isoamyl and the like. The lower alkoxy groups are ether groups having alkyl groups of the foregoing character attached to the oxygen.

The new compounds of Formula I are produced by reacting a 1-adamantanecarboxylic acid having one or two of the substituents R or $R^1$ with thionyl chloride, preferably by heating up to about reflux temperature, whereby the corresponding unsubstituted or substituted 1-adamantanecarbonyl chloride is obtained. The carbonyl chloride is converted to an alkyl 3-(1-adamantyl)-3-ketopropionate by reacting with a dialkyl malonate such as diethylmalonate and magnesium in anhydrous medium, e.g., benzene, alcohol, etc., preferably with heating, e.g., up to about reflux temperature.

The ketopropionate, upon treatment with acetic acid and sulfuric acid, releases carbon dioxide and is converted to the methyl 1-adamantyl ketone. Aluminum bromide and bromine, preferably in an anhydrous solvent such as ether, in the cold, halogenate the ketone to the bromomethyl 1-adamantyl ketone.

The bromomethyl 1-adamantyl ketone is then converted to the glyoxal of Formula I either by treatment with dimethylsulfoxide, e.g., at about room temperature, or alternatively by oxidation of the methyl 1-adamantyl ketone with selenium dioxide, e.g., in an inert organic medium such as dioxane.

The substituted or unsubstituted 1-adamantylglyoxal of Formula I may then be converted to the products of Formulas II and III by reaction with an inorganic salt, an amine, hydrazide or the like in an inert organic medium. Amines yield products of Formula II wherein $R^2$ is hydrogen but if an alkanol is used as the reaction medium then $R^2$ becomes lower alkoxy.

Suitable starting materials for the procedure described above include for example, 1-adamantanecarboxylic acid, 3-methyl-1-adamantanecarboxylic acid, 3-phenyl-1-adamantanecarboxylic acid, 3-methoxy-1-adamantanecarboxylic acid, 3-fluoro-, 3-chloro-, 3-bromo- and 3-iodo-1-adamantanecarboxylic acid, 3,5-dimethyl-1-adamantanecarboxylic acid, and the like.

The new compounds of this invention are useful as antiviral agents, e.g., against influenza virus such as A-PR8 or hepatic virus such as $MHV_3$. They may be administered orally or parenterally by incorporating an adequate therapeutic dose thereof, e.g., about 5 to about 500 mg., preferably 25 to 250 mg., in tablets, capsules, elixirs, injectables or the like along with conventional carriers, excipients, vehicles, lubricants, etc., according to accepted pharmaceutical practice.

The following examples are illustrative of the invention. All temperatures are on the centigrade scale.

Example 1.—Preparation of 1-adamantylglyoxal (a) Preparation of 1-adamantanecarboxylic acid chloride.—Ten grams of 1-adamantanecarboxylic acid and 20 ml. of thionyl chloride are heated under reflux for thirty minutes. The excess thionyl chloride is removed by distillation under reduced pressure. To remove the last traces of thionyl chloride, 10 ml. of anhydrous benzene is added to the residue and the benzene removed by distillation under reduced pressure. The residue crystallizes upon cooling and is obtained in quantitative yield. The 1-adamantanecarboxylic acid chloride is used in (b) without further purification.

(b) Preparation of bromomethyl 1-adamantyl ketone.—In a three-necked flask fitted with a stirrer, reflux condenser and dropping funnel there is placed 3.6 grams of magnesium turnings (activated with iodine), 11 ml. of anhydrous benzene and 1 ml. of absolute ethanol. The mixture is heated to initiate reaction. To this mixture there is then added dropwise a solution of 24.0 grams of diethyl malonate in 7 ml. of absolute alcohol and 30 ml. of anhydrous benzene. The rate of addition is controlled so as to maintain gentle reflux. When the addition is completed, the reaction mixture is refluxed until the magnesium is completely dissolved. The excess alcohol is then removed by distillation, through a short glass helices-packed column, as the azeotrope with benzene.

To the diethyl ethoxymagnesium malonate there is added with cooling and with vigorous stirring, a solution of 19.8 grams of 1-adamantanecarboxylic acid chloride (see a) in 25 ml. of anhydrous benzene over the course of 30–40 minutes. The reaction mixture is then refluxed for one hour and poured onto crushed ice. Dilute sulfuric acid is added to dissolve the precipitated solid. The benzene layer is separated, washed with water and dried over anhydrous sodium sulfate. The benzene and unreacted diethyl malonate are removed by distillation, first at atmospheric pressure and finally under reduced pressure. The residue is then distilled under reduced pressure and boils at 108–110° at 0.06 mm. The ethyl 3-(1-adamantyl)-3-ketopropionate thus obtained is dissolved in a mixture of 50 ml. of acetic acid, 30 ml. of water and 5.5 ml. of concentrated sulfuric acid and refluxed for 3–4 hours until the evolution of carbon dioxide has ceased. The mixture is then cooled and poured into 300 ml. of ice water. The methyl 1-adamantyl ketone precipitates as an oil which crystallizes rapidly. It melts at 53–54°, after recrystallization from aqueous methanol.

A solution of 8.9 grams of methyl 1-adamantyl ketone in 20 ml. of anhydrous ether is cooled in an ice bath, 200 mg. of aluminum bromide added and then 8 grams of bromine added dropwise with vigorous stirring. The bromine color disappears almost instantaneously. Water is then added to the reaction mixture and ether added to dissolve the precipitated solid. The ether layer is separated, dried over anhydrous sodium sulfate and concentrated to yield the desired bromomethyl 1-adamantyl ketone as a solid, melting at 78–79°.

(c) Preparation of 1-adamantylglyoxal.—A solution of 15 grams of bromomethyl 1-adamantyl ketone in 100 ml. of dimethyl sulfoxide is allowed to stand at room temperature for ten hours. The reaction mixture is then poured into ice water and extracted with diethyl ether. The ether extracts are washed with water and dried over anhydrous magnesium sulfate. Removal of the ether under reduced pressure yields the desired 1-adamantylglyoxal.

Example 2.—Alternate preparation of 1-adamantylglyoxal

A solution of 1.55 grams of selenium dioxide in 10 ml. of ninety percent aqueous dioxane is warmed to 70° and a solution of 1.78 grams of methyl 1-adamantyl ketone in 15 ml. of dioxane added. The mixture is refluxed for five hours and then filtered hot to remove the selenium. Upon cooling and concentration of the dioxane there is obtained the desired 1-adamantylglyoxal.

Example 3.—Preparation of 1-adamantylglyoxal, monosodium bisulfite addition product A solution of 1.92 grams of 1-adamantylglyoxal in 100 ml. of ethanol is poured into 200 ml. of a 1.5 percent aqueous sodium bisulfite solution. After standing overnight, the crystals which separated are collected, and washed with cold water to give the desired monosodium bisulfite addition product.

Example 4.—Preparation of 4-[2-(1-adamantyl)-2-oxo-1-ethoxyethyl]aminobenzoic acid A mixture of 1.92 grams of 1-adamantylglyoxal, 1.37 grams of p-aminobenzoic acid and 40 ml. of ethanol is heated at 60° for four hours. The reaction mixture is cooled and the crystals filtered to yield the desired product.

Example 5.—Preparation of 4-[2-(1-adamantyl)-2-oxo-1-hydroxyethyl]aminobenzoic acid A mixture of 1.92 grams of 1-adamantylglyoxal, 1.37 grams of p-aminobenzoic acid and 50 ml. of a 50% aqueous dioxane solution is heated with stirring at 60° for four hours. The mixture is cooled, diluted with water and filtered to yield the desired product.

Example 6.—Preparation of 1-adamantylglyoxalisonicotinoyl hydrazone

A mixture of 1.92 grams of 1-adamantylglyoxal, 1.37 grams of isonicotinoylhydrazide and 75 ml. of ethanol is refluxed for two hours. The reaction mixture is cooled, diluted with water and filtered to yield the desired product.

Example 7.—Preparation of 3-methyl-1-adamantylglyoxal

By substituting 3-methyl-1-adamantanecarboxylic acid for the 1-adamantaecarboxylic acid in the procedure of Example 1(a) but otherwise following that example, the desired product is obtained.

Example 8.—Preparation of 3-phenyl-1-adamantylglyoxal

By substituting 3-phenyl-1-adamantanecarboxylic acid for the 1-adamantanecarboxylic acid in the procedure of Example 1(a) but otherwise following that example, the desired product is obtained.

Example 9.—Preparation of 3-methyl-1-adamantylglyoxal

By substituting 3 - methoxy - 1 - adamantanecarboxylic acid for the 1-adamantanecarboxylic acid in the procedure of Example 1(a) but otherwise following that example, the desired product is obtained.

Example 10.—Preparation of 3-fluoro-1-adamantylglyoxal

By substituting 3-fluoro-1-adamantanecarboxylic acid for the 1-adamantanecarboxylic acid in the procedure of Example 1(a) but otherwise following that example, the desired product is obtained.

3-iodo-, 3-chloro-, and 3-bromo-1-adamantylglyoxal are similarly obtained.

Example 11.—Preparation of 3,5-dimethyl-1-adamantylglyoxal

By substituting 3,5-dimethyl-1-adamantanecarboxylic acid for the 1-adamantanecarboxylic acid in the procedure of Example 1(a) but otherwise following that example, the desired product is obtained.

Example 12.—Preparation of 3-methoxy-5-methyl-1-adamantylglyoxal (a) Preparation of 3 - bromo-5-methyl-1-adamantanecarboxlic acid.—To a stirred mixture of 100 ml. of dry bromine and 60 grams of anhydrous aluminum bromide, cooled to 0°, there is added over the course of 4 hours 32.5 grams of dry, powdered 3-methyl-1-adamantanecarboxylic acid. The reaction mixture is allowed to stand at 0–10° for 48 hours and then warmed to room temperature. After 5 hours the reaction mixture is poured onto 500 grams of finely chopped ice and 500 ml. of benzene added. The excess bromine is removed by treatment with solid sodium pyrosulfite until the bromine color disappears, the temperature of the mixture being kept at 0–10° during this treatment.

The benzene layer is separated and the aqueous phase extracted twice with benzene. The combined benzene extracts are washed with water and then extracted twice with 250 ml. of N sodium hydroxide solution. The combined alkaline solutions are extracted with ether and then acidified with 2 N sulfuric acid solution. After several hours the precipitate is filtered, air dried and crystallized from cyclohexane to yield the desired 3-bromo-5-methyl-1-adamantanecarboxylic acid.

(b) Preparation of 3-methoxy-5-methyl-1-adamantanecarboxylic acid.—Three grams of 3-bromo-5-methyl-1-adamantanecarboxylic acid is dissolved in 30 ml. of anhydrous methanol and 2.7 grams of dry silver oxide is added. The mixture is stirred under reflux for 6 hours, filtered and the solvent removed by distillation under reduced pressure. The residue is crystallized from cyclohexane to yield the desired 3-methoxy-5-methyl-1-adamantanecarboxylic acid.

(c) Preparation of 3-methoxy-5-methyl-1-adamantylglyoxal.—By then substituting 3-methoxy-5-methyl-1-adamantanecarboxylic acid for the 1-adamantanecarboxylic acid in the procedures of Example 1(a) but otherwise following that example, 3-methoxy-5-methyl-1-adamantylglyoxal is obtained.

Example 13.—Preparation of 1-adamantylglyoxal, 3-thiosemicarbazone

By substituting 3-thiosemicarbazide for the isonicotinoyl hydrazide in the procedure of Example 6, the desired product is obtained.

1-adamantylglyoxal, semicarbazone is similarly obtained.

What is claimed is:
1. A compound of the formula

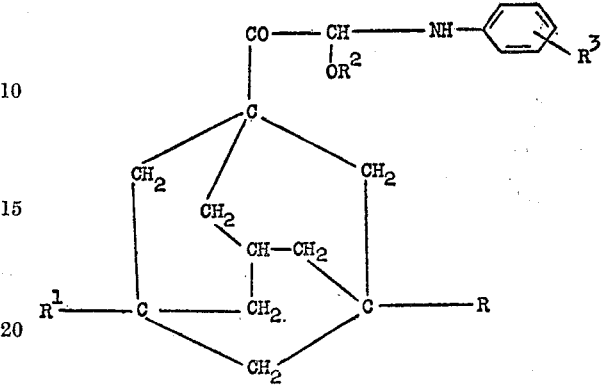

wherein R and R¹ each is a member of the group consisting of hydrogen, halo, lower alkyl, phenyl and lower alkoxy, R² is a member of the group consisting of hydrogen and lower alkyl, and R³ is a member of the group consisting of hydrogen, halo, lower alkyl, lower alkoxy and carboxy.

2. 4 - [2 - (1 - adamantyl) - 2 - oxo - 1 - ethoxyethyl] aminobenzoic acid.

3. 4 - [2 - (1 - adamantyl) - 2 - oxo - 1 - hydroxyethyl] aminobenzoic acid.

References Cited

Chemical Abstracts, By Angelo Lamola, vol. 61 (1964), pp. 593a and 594a relied on.

LORRAINE A. WEINBERGER, *Primary Examiner.*

L. A. THAXTON, *Assistant Examiner.*